(12) United States Patent
Haywood

(10) Patent No.: US 7,639,707 B2
(45) Date of Patent: Dec. 29, 2009

(54) VARIABLE SIZE FIFO MEMORY

(76) Inventor: Chris Haywood, 30501 Agoura Rd. Ste 203, Agoura Hills, CA (US) 91301

( * ) Notice: Subject to any disclaimer, the term of this patent is extended or adjusted under 35 U.S.C. 154(b) by 656 days.

(21) Appl. No.: 11/237,481

(22) Filed: Sep. 27, 2005

(65) Prior Publication Data

US 2006/0072598 A1    Apr. 6, 2006

Related U.S. Application Data

(63) Continuation of application No. 09/930,804, filed on Aug. 15, 2001, now Pat. No. 6,987,775.

(51) Int. Cl.
*H04L 12/54* (2006.01)

(52) U.S. Cl. .................. 370/429; 370/391; 370/394; 370/395.21; 370/412; 370/413; 370/428; 375/316; 710/29; 710/52

(58) Field of Classification Search .............. 370/391, 370/394, 395.21, 412–418, 429, 474, 428; 710/29, 52–56; 375/316, 372
See application file for complete search history.

(56) References Cited

U.S. PATENT DOCUMENTS

| | | | |
|---|---|---|---|
| 4,344,132 A * | 8/1982 | Dixon et al. ............ 710/60 |
| 4,394,725 A | 7/1983 | Blenvenu | |
| 4,704,606 A | 11/1987 | Hasley | |
| 4,754,451 A | 6/1988 | Eng | |
| 4,958,299 A | 9/1990 | Akada | |
| 5,406,554 A * | 4/1995 | Parry ............ 370/381 |
| 5,550,823 A | 8/1996 | Irie | |
| 5,606,370 A | 2/1997 | Moon | |
| 5,610,914 A | 3/1997 | Yamada | |
| 5,659,713 A | 8/1997 | Goodwin | |
| 5,818,839 A * | 10/1998 | Sterne et al. ............ 370/391 |
| 5,845,145 A | 12/1998 | James | |
| 5,884,099 A * | 3/1999 | Klingelhofer ............ 710/52 |
| 5,892,979 A * | 4/1999 | Shiraki et al. ............ 710/52 |
| 5,905,911 A | 5/1999 | Shimizu | |

(Continued)

OTHER PUBLICATIONS

PetaSwitch Solutions, Inc., The Pisces Chipset, Product Brief, 2001 www.peta-switch.com/products/product_brief.htm.

(Continued)

*Primary Examiner*—William Trost, IV
*Assistant Examiner*—Toan D Nguyen
(74) *Attorney, Agent, or Firm*—McDonnell Boehnen Hulbert & Berghoff LLP

(57) ABSTRACT

A variable size first in first out (FIFO) memory is disclosed. The variable size FIFO memory may include head and tail FIFO memories operating at a very high data rate and an off chip buffer memory. The off chip buffer memory may be, for example, of a dynamic RAM type. The off chip buffer memory may temporarily store data packets when both head and tail FIFO memories are full. Data blocks of each of the memories may be the same size for efficient transfer of data. After a sudden data burst which causes memory overflow ceases, the head and tail FIFO memories return to their initial functions with the head FIFO memory directly receiving high speed data and transmitting it to various switching element and the tail FIFO memory storing temporary overflows of data from the head FIFO memory.

21 Claims, 3 Drawing Sheets

U.S. PATENT DOCUMENTS

| | | | |
|---|---|---|---|
| 5,961,626 | A | 10/1999 | Harrison |
| 5,974,516 | A | 10/1999 | Qureshi |
| 5,982,749 | A | 11/1999 | Daniel |
| 6,067,408 | A | 5/2000 | Runaldue |
| 6,122,674 | A | 9/2000 | Olnowich |
| 6,145,068 | A | 11/2000 | Lewis |
| 6,172,927 | B1 | 1/2001 | Taylor |
| 6,292,878 | B1 | 9/2001 | Morioka |
| 6,389,489 | B1 | 5/2002 | Stone |
| 6,442,674 | B1 | 8/2002 | Lee et al. |
| 6,460,120 | B1 | 10/2002 | Bass |
| 6,487,171 | B1 | 11/2002 | Honig |
| 6,493,347 | B2 | 12/2002 | Sindhu |
| 6,510,138 | B1 | 1/2003 | Pannell |
| 6,557,053 | B1 | 4/2003 | Bass et al. |
| 6,570,876 | B1 | 5/2003 | Aimoto |
| 6,574,194 | B1 | 6/2003 | Sun et al. |
| 6,611,527 | B1 | 8/2003 | Moriwaki |
| 6,658,503 | B1 | 12/2003 | Agarwala et al. |
| 6,687,768 | B2 | 2/2004 | Horikomi |
| 6,708,262 | B2 | 3/2004 | Manning |
| 6,754,741 | B2 | 6/2004 | Alexander et al. |
| 6,795,870 | B1 | 9/2004 | Bass |
| 6,941,426 | B2 | 9/2005 | Haywood |
| 6,944,688 | B1 * | 9/2005 | Batcher .................. 710/55 |
| 2001/0037435 | A1 | 11/2001 | Van Doren |
| 2002/0054602 | A1 | 5/2002 | Takahashi |
| 2002/0099855 | A1 | 7/2002 | Bass |
| 2002/0122386 | A1 | 9/2002 | Calvignac |

OTHER PUBLICATIONS

PetaSwitch Solutions, Inc., PetaSwtich Solutions Announces Raising $4 Million in First Round Financing, Press Release, 2001, http://peta-switch.com/newsroom/press_releases.htm.

Gupta, Scheduling in Input Queued Switches: A Survey, 1996, Department of Computer Science, Stanford University, California.

Schoenen et al., Distributed Cell Scheduling Algorithms for Virtual-Output-Queued Switches, Dec. 1999, pp. 1211-1215, vol. 1, Globecom, IEEE Global Telecommunications Conference.

Fahmy. A Survey of ATM Switching Techniques, Aug. 14, 2001, Department of Computer and Information Science, The Ohio State University.

Stiliadis et al., Rate-Proportional Servers: A Design Methodology for Fair Queueing Algorithms, Dec. 1995, Computer Engineering & Information Sciences, University of California, Santa Cruz.

* cited by examiner

VARIABLE SIZE FIFO MEMORY

RELATED APPLICATION INFORMATION

This patent is a continuation of application Ser. No. 09/930,804 filed Aug. 15, 2001 and now U.S. Pat. No. 6,987,775, and which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to variable size FIFO memories.

2. Description of the Related Art

Communications networks now require handling of data at very high serial data rates. For example, 10 gigabits per second (Gbps) is common. When it is required to process at these speeds, high speed parallel connections are used to increase the effective bandwidth. This may be unsatisfactory because of the resultant decrease in bandwidth due to increased overhead requirements.

DETAILED DESCRIPTION OF PREFERRED INVENTION

Figure 1:
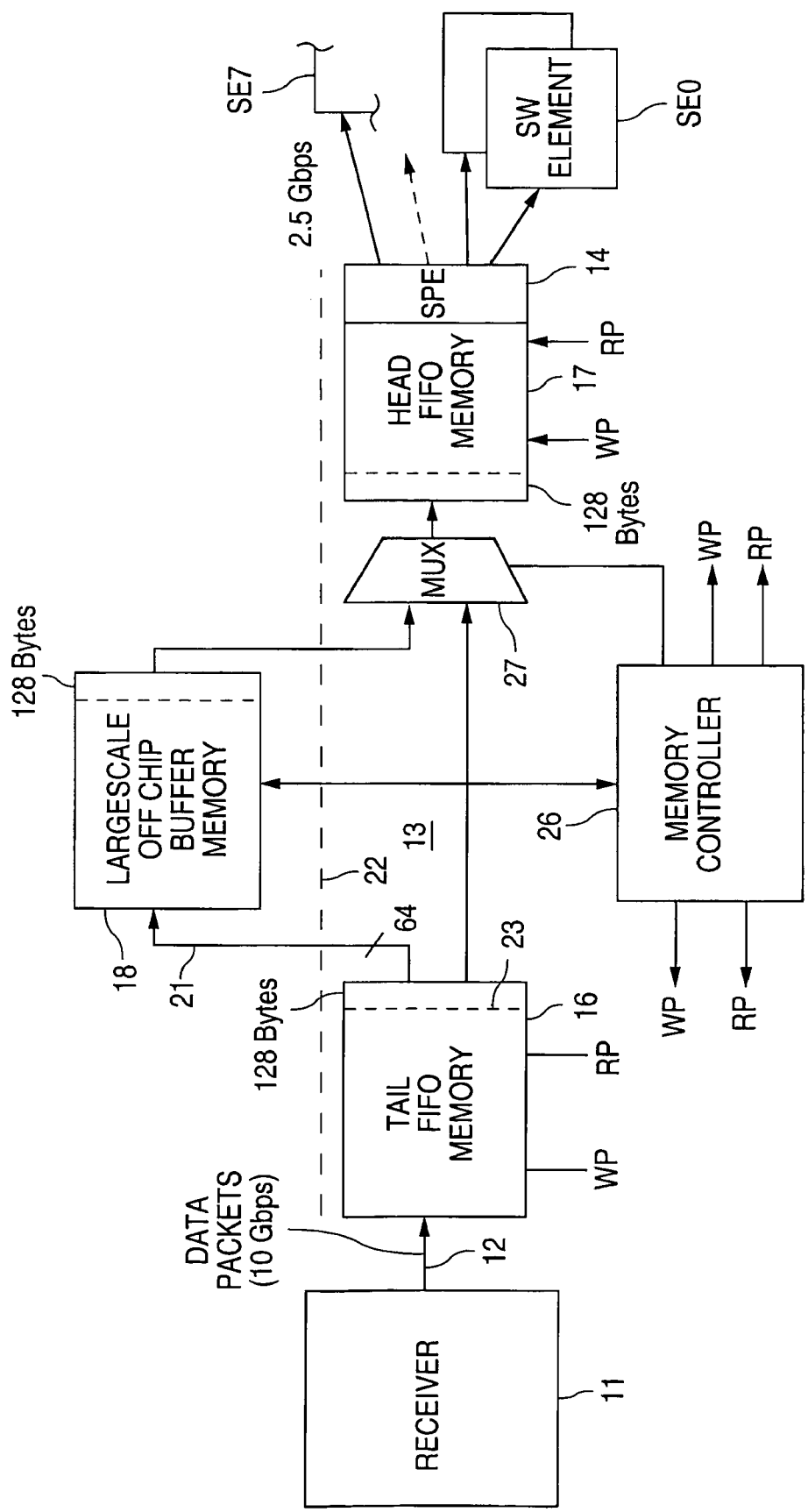
FIG. 1 is a block diagram of a memory embodying the present invention.

As disclosed in a co-pending application entitled High Speed Channels Using Multiple Parallel Lower Speed Channels having Ser. No. 09/962,056, switching of input data arriving at a relatively high data rate of, for example, 10 Gbps, may be accomplished. As illustrated in FIG. 1, a plurality of switching elements SE0-SE7 may operate at a lower data rate, for example 2.5 Gbps. By the use of a sequential or successive sprinkling technique for complete data packets, a high data rate may be maintained. Data packets arrive from a receiver 11 on line 12 at 10 Gbps and via the variable FIFO memory 13, FIFO being First In First Out memory. The receiver 11 may have a communications processor coupled to it. Data packets are routed to a sequential sprinkler engine (SPE) 14 and then distributed at the lower data rate to various switching elements SE0-SE7. In general, a variable FIFO memory is beneficial where a sudden burst of input data may occur which would temporarily overwhelm an individual FIFO memory without a large scale buffer memory 18 (which it can be assumed has almost unlimited memory capacity since it is remote or off the same semiconductor chip as the high speed memory).

Figure 2:
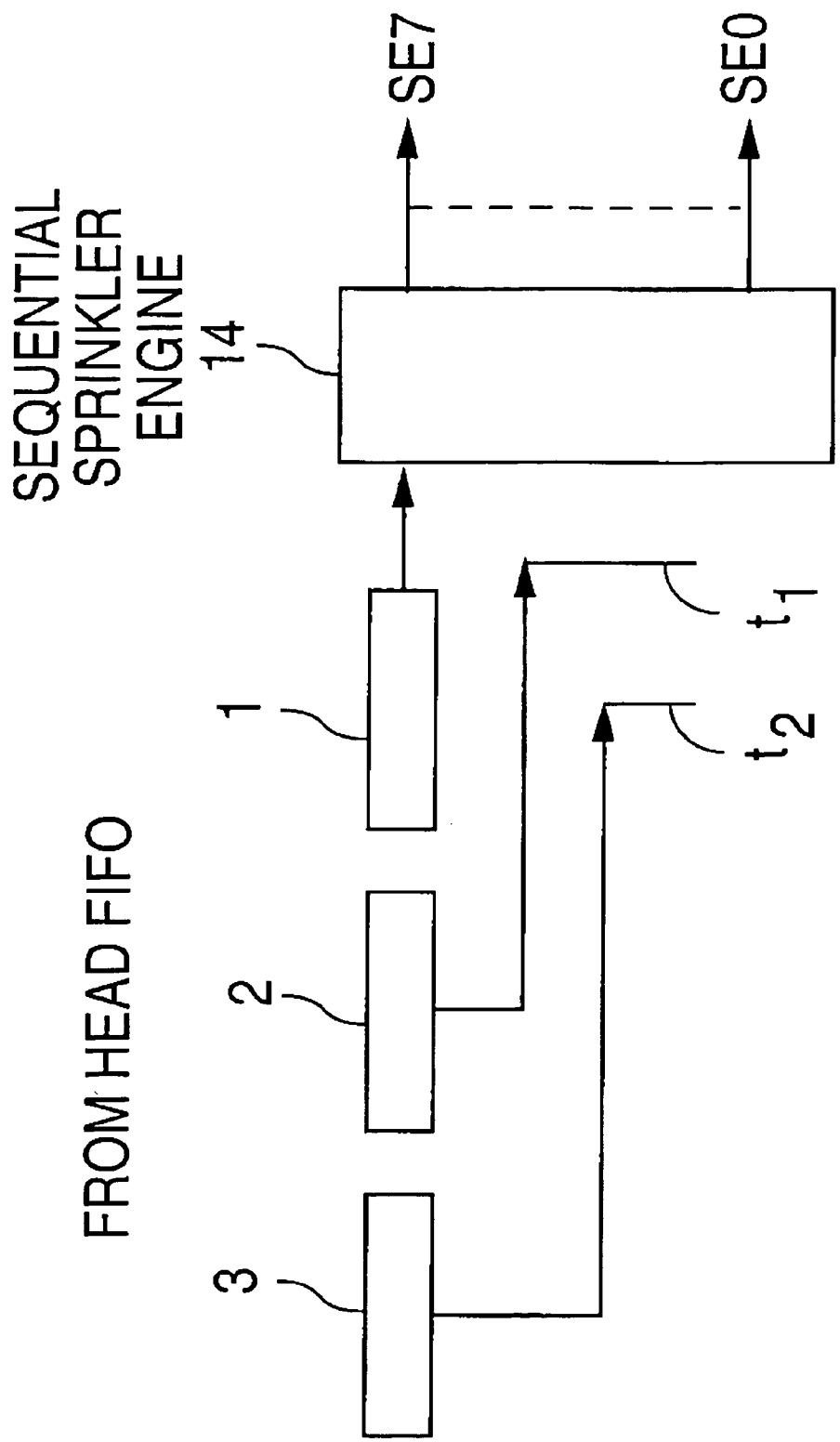
FIG. 2 is a diagrammatic portion of FIG. 1 illustrating its operation.

FIG. 2 illustrates where some latency may occur; in other words, thee would not be a continuous serial transmission of the high speed data packets through to the switch elements. Thus the data packets 1, 2, 3 are indicated in a line of data being received. The first data packet is routed to the switching element 7. After this operation is started, a short time later, as indicated by the time lapse $t_1$, data packet two is distributed by the sprinkler engine; and then data packet three at a later time $t_2$. Some latency occurs which must be compensated for by some type of buffer apparatus.

This is provided by the overall variable FIFO memory which is a combination of a tail FIFO memory 16, a head FIFO memory 17 and the large scale off chip buffer memory 18. Variable blocks of data are formed by a receiver 11 and transferred through the tail FIFO memory to the head FIFO memory 17 until it is filled. Thus, the tail or FIFO 16 routes data to the head FIFO memory 17 which then distributes data packets to the various switching elements. If the head FIFO memory becomes full, the tail FIFO memory will start filling. The tail FIFO will buffer enough data to keep the head FIFO filled. If the tail FIFO fills due to a sudden burst, data is then written on the line of 21 to the large scale off chip memory 18. This data will be read from the large scale memory into the head FIFO when the head FIFO starts to empty.

From a practical standpoint to operate at the rate of 10 Gbps, tail FIFO 16 and head FIFO 17 are located on a common semiconductor substrate or chip with the large scale buffer memory 18 being remotely located off chip. This is indicated by the dash line 22. When the tail FIFO memory becomes full then the large scale off chip buffer memory 18 is utilized. Uniform blocks of data are stored indicated by the dash line 23. For example, 128 bytes is transferred on the line 21 into the memory 18. This memory also includes a similar block size of 128 bytes. For example, line 21 may have a 64 bit width (meaning eight bytes) and thus, the data block of 128 bytes is transferred in 16 clock cycles (16×64=128 bytes). Optimization of the bus width in all of the FIFO and buffer memories provide, in effect, a 100 percent efficient transfer technique since for every clock cycle a maximum number of bits is transferred. However buffer memory 18 has a lower clock rate and therefore wider bus. In the present application this could be two read and two write cycles. The various write pointers and read pointers (WP and RP) are so indicated on the various memories and the overall control is accomplished by the memory controller 26. A multiplexer 27 connected to memory controller 26 provides for control of the various data routings. When a sudden burst of data packets ceases, the FIFO memory can then return to its ordinary mode of operation where the head FIFO memory 17 contains all of the inputted data packets as delivered by the tail FIFO memory. Of course, this doesn't occur until the large scale off chip buffer memory 18 is unloaded.

Figure 3:
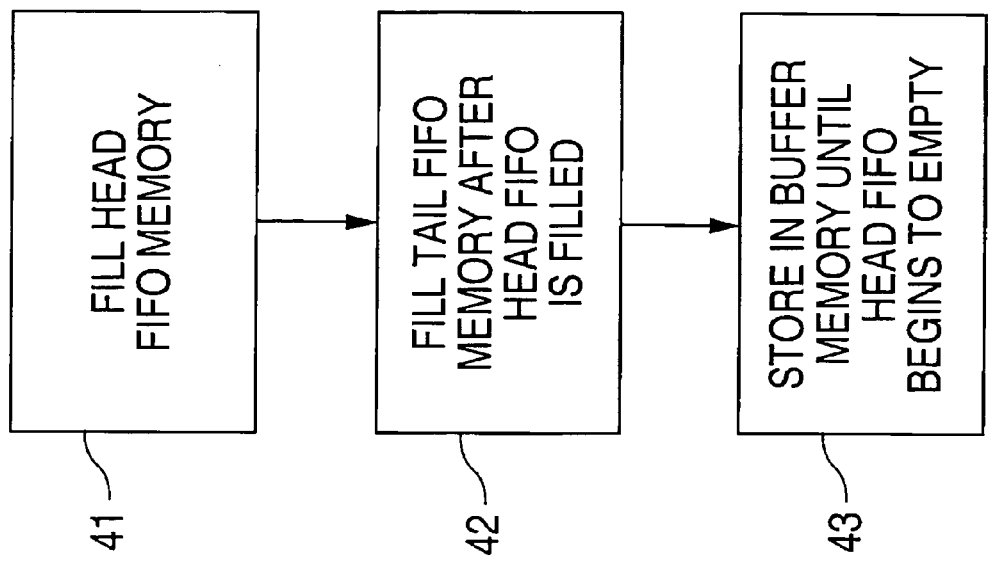
FIG. 3 is a flow chart of the operation of FIG. 1.

The foregoing operation is shown in a flowchart of FIG. 3. In step 41 the head FIFO memory is filled, and in step 42 if the head FIFO overflows, the tail FIFO memory is filled. Then in step 43 again when the tail FIFO is filled, data is stored in the buffer memory until the head FIFO begins to empty. In general, memory controller 26 monitors the FIFO depth and determines if a block of data needs to be stored to off chip memory. It also keeps track of how many blocks are written. As the FIFO memories empty, the memory controller is responsible for arbitrating and retrieving any stored blocks of data.

The larger external buffer memory 18 can be provisioned, using one of many allocation schemes, to support multiple head and tail FIFOs in the same manner as described.

Thus a variable FIFO memory with head and tail caching has been provided.

It is claimed:

1. An apparatus comprising:
  a first memory configured to receive data packets at a first transmission rate, wherein a time delay exists between at least two sequential data packets;
  a buffer memory configured to receive the data packets from the first memory;

a second memory configured to receive the data packets from the first memory or the buffer memory in a sequential order in which the data packets were received at the first memory; and a sequential sprinkler engine configured to send the data packets from the second memory to a plurality of switching elements at a second transmission rate in the sequential order in which the data packets were received at the first memory, and wherein the second transmission rate is slower than the first transmission rate.

2. The apparatus of claim 1, further comprising a controller configured to control a flow of the data packets from the first memory to the second memory, from the first memory to the buffer memory, and from the buffer memory to the second memory, and wherein the controller is configured to control the flow of the data packets based on a plurality of memory fill-level thresholds associated with the first and second memories.

3. The apparatus of claim 1 configured to allow the data packets to flow from the first memory to the second memory as an amount of the data packets stored in the second memory does not exceed a fill-level threshold associated with the second memory.

4. The apparatus of claim 1 configured to store the data packets in the first memory when an amount of the data packets stored in the second memory exceeds a fill-level threshold associated with the second memory and when an amount of the data packets stored in the first memory does not exceed a fill-level threshold associated with the first memory.

5. The apparatus of claim 1 configured to allow the data packets to flow from the first memory to the buffer memory when an amount of data stored in the first memory exceeds a fill-level threshold associated with the first memory.

6. The apparatus of claim 1 configured so that the data packets arrive at the second memory from the first memory or the second memory when an amount of data stored in the second memory does not exceed a fill-level threshold associated with the second memory.

7. The apparatus of claim 1, wherein the first transmission rate is approximately 10 Gbps, and wherein the second transmission rate is approximately 2.5 Gbps.

8. The apparatus of claim 1, wherein the first and second memories are first-in-first-out memories.

9. A method comprising:
receiving a plurality of data packets at a first transmission rate at a first memory, wherein a time delay exists between at least two sequential data packets;
sending the data packets from the first memory to a second memory or a buffer memory based on fill-level thresholds associated with the first and second memories;
receiving the data packets at the second memory from the first memory or the buffer memory in a sequential order in which the data packets were received at the first memory; and
sending the data packets from the second memory to a plurality of switching elements at a second transmission rate in the sequential order in which the data packets were received at the first memory, and wherein the second transmission rate is less than the first transmission rate.

10. The method of claim 9, further comprising:
controlling a flow of the data packets from the first memory to the second memory, from the first memory to the buffer memory, and from the buffer memory to the second memory based on a plurality of memory fill-level thresholds associated with the first and second memories.

11. The method of claim 9, further comprising:
controlling a flow of the data packets from the first memory to the second memory based on a memory fill-level threshold associated with the second memory; and
controlling the flow of the data packets from the first memory to the buffer memory based on a memory fill-level threshold associated with the first memory.

12. The method of claim 9, further comprising:
storing the data packets in the first memory when a fill-level threshold associated with the second memory is exceeded; and
sending the data packets from the first memory to the buffer memory when a fill-level threshold associated with the first memory is exceeded.

13. The method of claim 9, wherein the first transmission rate is approximately 10 Gbps, and wherein the second transmission rate is approximately 2.5 Gbps.

14. The method of claim 9, wherein the first and second memories are first-in-first-out memories.

15. A system comprising:
a first memory configured to receive data packets at a first transmission rate, wherein a time delay exists between at least two sequential data packets;
a buffer memory configured to receive the data packets from the first memory;
a second memory configured to receive data packets from the first memory or the buffer memory;
means for delivering the data packets to the second memory from the first memory or the buffer memory in a sequential order in which the data packets were received at the first memory; and
means for sending the data packets from the second memory to a plurality of switching elements at a second transmission rate in the sequential order in which the data packets were received at the first memory, and wherein the second transmission rate is slower than the first transmission rate.

16. The system of claim 15, wherein the means for delivering the data packets comprises means for controlling the flow of data packets to the second memory from the first memory or the buffer memory based on a memory fill-level indicator associated with the second memory, and means for controlling the flow of data packets from the first memory to the buffer memory based on a memory fill-level indicator associated with the first memory.

17. The system of claim 15, configured to allow the data packets to flow from the first memory to the second memory when an amount of data packets stored in the second memory does not exceed a fill-level threshold associated with the second memory.

18. The system of claim 15, configured to store the data packets in the first memory when an amount of the data packets stored in the second memory exceeds a fill-level threshold associated with the second memory, and when an amount of the data packets stored in the first memory does not exceed a fill-level threshold associated with the first memory.

19. The system of claim 15, configured to allow the data packets to flow from the first memory to the buffer memory when an amount of data stored in the first memory exceeds a fill-level threshold associated with the first memory.

20. The system of claim 15, wherein the first transmission rate is approximately 10 Gbps, and wherein the second transmission rate is approximately 2.5 Gbps.

21. The system of claim 15, wherein the first and second memories are first-in-first-out memories.

* * * * *

UNITED STATES PATENT AND TRADEMARK OFFICE
CERTIFICATE OF CORRECTION

PATENT NO. : 7,639,707 B2  Page 1 of 1
APPLICATION NO. : 11/237481
DATED : December 29, 2009
INVENTOR(S) : Chris Haywood It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Twenty-first Day of December, 2010

David J. Kappos
*Director of the United States Patent and Trademark Office*